US011336761B2

(12) United States Patent
Ran et al.

(10) Patent No.: US 11,336,761 B2
(45) Date of Patent: May 17, 2022

(54) MIDDLE FRAME AND TERMINAL DEVICE

(71) Applicant: HUAWEI TECHNOLOGIES CO., LTD., Guangdong (CN)

(72) Inventors: Jianbo Ran, Dongguan (CN); Ding Zhong, Dongguan (CN); Wenming Shi, Dongguan (CN); Hehui Yang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/006,134

(22) Filed: Aug. 28, 2020

(65) Prior Publication Data

US 2020/0396323 A1   Dec. 17, 2020

Related U.S. Application Data

(63) Continuation of application No. PCT/CN2019/076673, filed on Mar. 1, 2019.

(30) Foreign Application Priority Data

Mar. 2, 2018   (CN) .......................... 201810175739.4

(51) Int. Cl.
*H04M 1/02*   (2006.01)
(52) U.S. Cl.
CPC ................................. *H04M 1/0266* (2013.01)
(58) Field of Classification Search
CPC ........... H04M 1/0266; H04M 1/72577; H04M 1/72527; H04M 1/72569; G01G 7/00; G01G 19/52; G01G 21/28; H04B 1/3888
See application file for complete search history.

(56) References Cited

U.S. PATENT DOCUMENTS

| | | | |
|---|---|---|---|
| 2012/0044437 A1 | 2/2012 | Dai | |
| 2012/0269489 A1 | 10/2012 | Park et al. | |
| 2013/0335275 A1* | 12/2013 | Sanford | H01Q 1/38 343/702 |
| 2015/0077909 A1* | 3/2015 | Filiz | H04M 1/0266 361/679.01 |
| 2015/0133204 A1* | 5/2015 | Ivanovski | H04B 1/3816 455/575.8 |
| 2018/0157092 A1* | 6/2018 | Jung | B32B 17/1055 |

FOREIGN PATENT DOCUMENTS

| | | |
|---|---|---|
| CN | 104551562 A | 4/2015 |
| CN | 204294899 U | 4/2015 |
| CN | 204517886 U | 7/2015 |
| CN | 104853549 A | 8/2015 |

(Continued)

*Primary Examiner* — Ernest G Tacsik (74) *Attorney, Agent, or Firm* — Womble Bond Dickinson (US) LLP (57) ABSTRACT

Embodiments of this application describe a middle frame and a terminal device, where the middle frame includes a middle plate, at least one middle element, at least one welding platform, and an outer frame. The at least one middle element is fixedly connected to an edge of the middle plate, and the at least one welding platform is fixedly connected to an inner side of the outer frame. Further, the at least one welding platform on the outer frame is in welded connection with the at least one middle element on the middle plate.

14 Claims, 5 Drawing Sheets

(56) References Cited

FOREIGN PATENT DOCUMENTS

| | | | |
|---|---|---|---|
| CN | 104959564 | A | 10/2015 |
| CN | 104981126 | A | 10/2015 |
| CN | 104999054 | A | 10/2015 |
| CN | 105049554 | A | 11/2015 |
| CN | 105057978 | A | 11/2015 |
| CN | 106375522 | A | 2/2017 |
| CN | 106435686 | A | 2/2017 |
| CN | 106973536 | A | 7/2017 |
| CN | 107322245 | A | 11/2017 |
| CN | 207010756 | U | 2/2018 |
| CN | 207910830 | U | 9/2018 |
| CN | 208316776 | U | 1/2019 |
| CN | 110225151 | A | 9/2019 |

* cited by examiner

FIG. 7

MIDDLE FRAME AND TERMINAL DEVICE

CROSS-REFERENCE TO RELATED APPLICATIONS

This application is a continuation of International Application No. PCT/CN2019/076673, filed on Mar. 1, 2019, which claims priority to Chinese Patent Application No. 201810175739.4, filed on Mar. 2, 2018. The disclosures of the aforementioned applications are hereby incorporated by reference in their entireties.

TECHNICAL FIELD

Embodiments of this application relate to the mechanical field, and more specifically, to a middle frame and a terminal device.

BACKGROUND

With the development of smartphones, the industry is paying increasing attention to appearances and textures of the smartphones. Stainless steel has become a material for middle frames of a large quantity of smartphones due to its high strength and outstanding texture.

Currently, in the related art, a computer numerical control (CNC) machine is used to process a stainless steel plate into an integrally formed middle frame. However, it takes a relatively long time to produce such an integrally formed middle frame.

SUMMARY

Embodiments of this application provide a middle frame and a terminal device, to resolve a problem that it takes a relatively long time to produce a middle frame. The embodiments of this application are implemented as follows.

According to a first aspect, an embodiment of this application provides a middle frame, including a middle plate, at least one middle element, at least one welding platform, and an outer frame, where the at least one middle element is fixedly connected to an edge of the middle plate; the at least one welding platform is fixedly connected to an inner side of the outer frame; and the at least one welding platform on the outer frame is in welded connection with the at least one middle element on the middle plate.

In the first aspect, the middle plate, the at least one middle element, the at least one welding platform, and the outer frame are simple in structural form, and each may be produced alone; and connection manners between the middle plate, the at least one middle element, the at least one welding platform, and the outer frame are simple. Therefore, compared with production of an integrally formed middle frame, a processing process of the middle frame provided in the embodiments of this application is simpler, and therefore less time is consumed in producing the middle frame. In addition, because the at least one welding platform is fixedly connected to the inner side of the outer frame, and the at least one middle element is fixedly connected to the edge of the middle plate, it is convenient to weld the at least one welding platform to the at least one middle element, thereby ensuring that the middle frame has relatively high strength to make the middle frame have relatively good support performance.

In a possible embodiment, a first end of the at least one middle element is fixedly connected to the edge of the middle plate, and a second end of the at least one middle element extends in a direction away from the middle plate; a first end of the at least one welding platform is fixedly connected to the inner side of the outer frame, and a second end of the at least one welding platform extends towards the inner side of the outer frame; and the second end of the at least one welding platform on the outer frame is in welded connection with the second end of the at least one middle element on the middle plate, and a gap is formed between the outer frame and the middle plate.

Although the middle plate conducts heat to the outer frame through the second end of the at least one welding platform and the second end of the at least one middle element, the outer frame and the middle plate are partially connected, and there is still a gap between the outer frame and the middle plate. Therefore, a speed at which the middle plate conducts heat to the outer frame through the partial connection is relatively slow, and the gap between the outer frame and the middle plate can achieve a heat insulation effect.

In a possible embodiment, the gap formed between the outer frame and the middle plate is filled with plastic.

In this way, the middle frame can have relatively good buffer performance when the middle frame falls.

In a possible embodiment, the at least one middle element is in embedded connection with the edge of the middle plate.

In a die casting process of the middle plate, the at least one middle element is embedded into the middle plate when the middle plate is in a molten state, so that the at least one middle element can be better fastened to the middle plate.

In a possible embodiment, a longest distance on a cross-section, roughly parallel with the middle plate, of a part that is of the at least one middle element and that is embedded into the middle plate is 100 millimeters.

In a possible embodiment, a depth at which the at least one middle element is embedded into the middle plate is less than or equal to 10 millimeters.

In a possible embodiment, at least one groove is disposed on a surface of the middle plate, a buckle is disposed on the at least one middle element, and the buckle on the at least one middle element is embedded into the at least one groove on the middle plate.

After the buckle on the at least one middle element is embedded into the at least one groove on the middle plate, the buckle on the at least one middle element is firmly hooked into the at least one groove on the middle plate, achieving better connection performance between the at least one middle element and the middle plate.

In a possible embodiment, the fixed connection includes at least one of an embedded connection, bonding, riveting, a screw-locking connection, or a groove-buckle connection.

In a possible embodiment, the at least one middle element is made of a first metal material; the at least one welding platform is made of a second metal material; a difference between melting points of the first metal material and the second metal material is less than or equal to a melting point threshold; and the melting point threshold is used to indicate weldability between the two types of metal materials.

The melting point threshold is used to indicate welding performance between the two types of metal materials. If the difference between the melting points of the two types of metal materials is less than or equal to the melting point threshold, it indicates that there is good welding performance between the two types of metal materials. If the difference between the melting points of the two types of metal materials is greater than the melting point threshold, it indicates that there is relatively poor welding performance between the two types of metal materials. Therefore, to ensure welding strength between the at least one middle element and the at least one welding platform, two types of metal materials with good welding performance are selected.

In a possible embodiment, the at least one middle element is made of a first metal material; the at least one welding platform is made of a second metal material; a main element of the first metal material is the same as that of the second metal material; both weight percentage content of the main element in the first metal material and weight percentage content of the main element in the second metal material are greater than or equal to a threshold; and the threshold ranges from 60% to 100%.

The threshold is a critical value of weight percentage content of a main element in a metal material, and is used to measure whether the two types of metal materials are of a same type. When the at least one middle element and the at least one welding platform are made of a same type of material, an optimal welding effect can be achieved.

In a possible embodiment, both the first metal material and the second metal material are stainless steel, titanium alloys, aluminum alloys, magnesium alloys, zinc alloys, or copper alloys.

In a possible embodiment, the outer frame is obtained by bending and welding a stainless steel profile formed by rolling.

The following briefly describes how to obtain the outer frame: First, a stainless steel plate can be rolled to obtain the stainless steel profile; then the stainless steel profile is bent into a rectangle with a notch; and finally the rectangular stainless steel profile with the notch is welded into a closed rectangular outer frame.

Because the outer frame is obtained by bending and welding the stainless steel profile, no raw material is wasted in a process of processing the outer frame.

According to a second aspect, an embodiment of this application provides a terminal device, where the terminal device includes a display and a rear cover, the terminal device further includes the middle frame disclosed in the first aspect or any possible embodiment or combination of embodiments of the first aspect, and the display and the rear cover are fastened on two sides of the middle frame.

DESCRIPTION OF EMBODIMENTS

The following describes the technical solutions in the embodiments of this application with reference to the accompanying drawings in the embodiments of this application.

Figure 1:
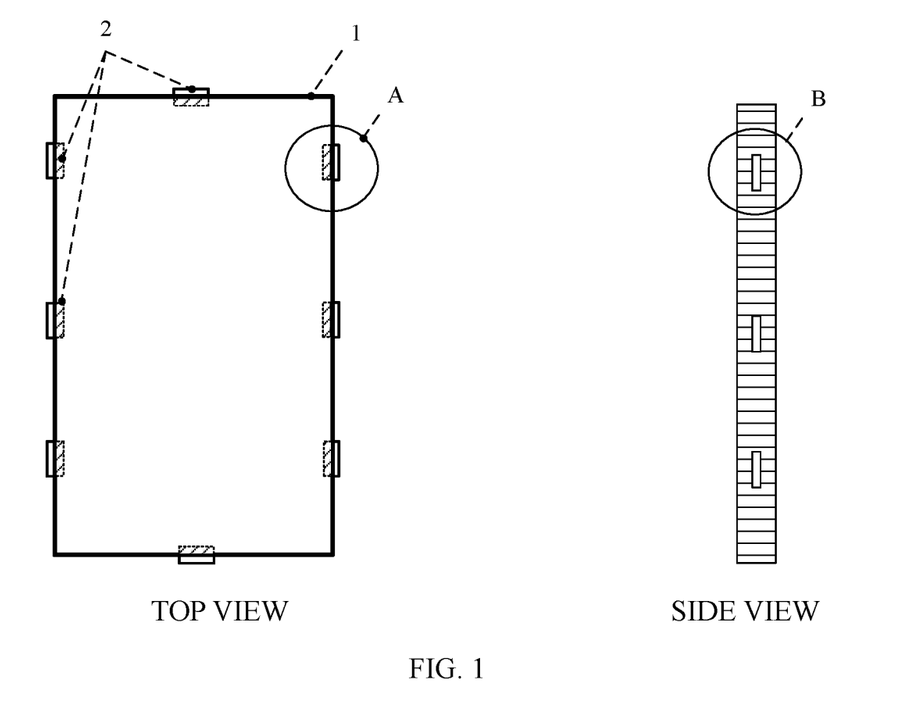
FIG. 1 is a schematic diagram of a middle plate and at least one middle element of a middle frame disclosed in an embodiment of this application.
Figure 2:
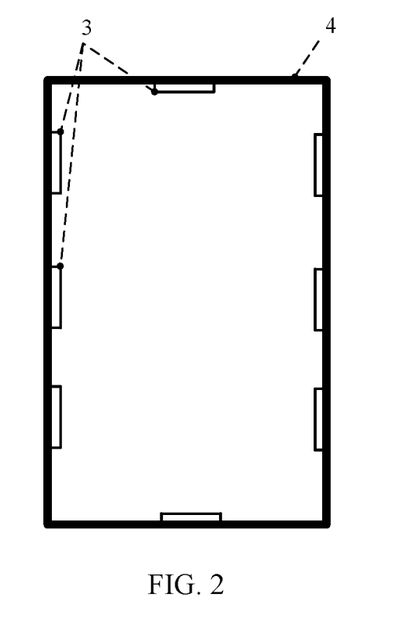
FIG. 2 is a schematic diagram of at least one welding platform and an outer frame of a middle frame disclosed in an embodiment of this application.
Figure 3:
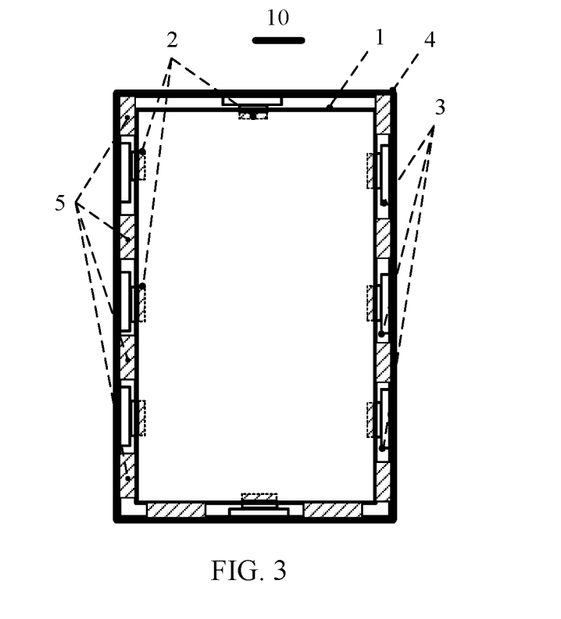
FIG. 3 is an overall schematic diagram of a middle frame disclosed in an embodiment of this application.

Referring to FIG. 1 to FIG. 3, FIG. 1 is a schematic diagram of a middle plate and at least one middle element of a middle frame disclosed in an embodiment of this application. FIG. 2 is a schematic diagram of at least one welding platform and an outer frame of a middle frame disclosed in an embodiment of this application. FIG. 3 is an overall schematic diagram of a middle frame disclosed in an embodiment of this application.

In the embodiments shown in FIG. 1 to FIG. 3, the middle frame 10 provided in the embodiments of this application includes the middle plate 1, the at least one middle element 2, the at least one welding platform 3, and the outer frame 4, where the at least one middle element 2 is fixedly connected to an edge of the middle plate 1; the at least one welding platform 3 is fixedly connected to an inner side of the outer frame 4; and the at least one welding platform 3 on the outer frame 4 is in welded connection with the at least one middle element 2 on the middle plate 1.

In the embodiments shown in FIG. 1 to FIG. 3, the middle plate 1, the at least one middle element 2, the at least one welding platform 3, and the outer frame 4 are simple in structural form, and each may be produced alone; and connection manners between the middle plate 1, the at least one middle element 2, the at least one welding platform 3, and the outer frame 4 are simple. Therefore, compared with production of an integrally formed middle frame, a processing process of the middle frame 10 provided in the embodiments of this application is simpler, and therefore less time is consumed in producing the middle frame 10. In addition, because the at least one welding platform 3 is fixedly connected to the inner side of the outer frame 4, and the at least one middle element 2 is fixedly connected to the edge of the middle plate 1, it is convenient to weld the at least one welding platform 3 to the at least one middle element 2, thereby ensuring that the middle frame 10 has relatively high strength to make the middle frame 10 have relatively good support performance.

There are various types of fixed connection manners. For example, the fixed connection includes at least one of an embedded connection, bonding, riveting, a screw-locking connection, or a groove-buckle connection.

To ensure that the middle frame 10 has relatively high strength, the at least one middle element 2, the at least one welding platform 3, and the outer frame 4 all may be made of metal with relatively high strength, for example, stainless steel or titanium alloys, and the middle plate 1 may be made of metal such as an aluminum alloy or a copper alloy.

In a conventional outer frame production process, an outer frame in an original form is cut from an entire steel plate, and the remaining part of the entire steel plate is discarded. Therefore, a large quantity of metal materials are wasted in the conventional outer frame production process.

To save raw materials during processing of the outer frame 4, the outer frame 4 in the embodiments of this application may be obtained by bending and welding a stainless steel profile formed by rolling. The following briefly describes how to obtain the outer frame 4: First, a stainless steel plate can be rolled to obtain the stainless steel profile; then the stainless steel profile is bent into a rectangle with a notch; and finally the rectangular stainless steel profile with the notch is welded into a closed rectangular outer frame 4.

Because the outer frame 4 is obtained by bending and welding the stainless steel profile, no raw material is wasted in a process of processing the outer frame 4.

In the embodiments shown in FIG. 1 to FIG. 3, to ensure welding strength between the at least one middle element 2 and the at least one welding platform 3, the following manner may be used in the embodiments of this application.

The at least one middle element 2 is made of a first metal material; the at least one welding platform 3 is made of a second metal material; and a difference between melting points of the first metal material and the second metal material is less than or equal to a melting point threshold.

There may be various types of first metal materials and second metal materials mentioned in the embodiments of this application. For example, both the first metal material and the second metal material are stainless steel. For another example, both the first metal material and the second metal material are titanium alloys. For still another example, both the first metal material and the second metal material are aluminum alloys. For still another example, both the first metal material and the second metal material are magnesium alloys. For another example, both the first metal material and the second metal material are zinc alloys. For still another example, both the first metal material and the second metal material are copper alloys. Certainly, the first metal material and the second metal material mentioned in the embodiments of this application are not limited to the metal materials mentioned above.

In addition, the middle plate 1 and the outer frame 4 may be made of various types of materials. The materials of the middle plate 1 and the outer frame 4 are not limited in the embodiments of this application.

In the embodiments shown in FIG. 1 to FIG. 3, the melting point threshold is used to indicate weldability between the two types of metal materials. If the difference between the melting points of the two types of metal materials is less than or equal to the melting point threshold, it indicates that there is good weldability between the two types of metal materials. If the difference between the melting points of the two types of metal materials is greater than the melting point threshold, it indicates that there is relatively poor weldability between the two types of metal materials. Therefore, to ensure the welding strength between the at least one middle element 2 and the at least one welding platform 3, two types of metal materials with good welding performance are selected.

In the embodiments shown in FIG. 1 to FIG. 3, to ensure the welding strength between the at least one middle element 2 and the at least one welding platform 3, the following manner may alternatively be used in the embodiments of this application.

The at least one middle element 2 is made of a first metal material; the at least one welding platform 3 is made of a second metal material; a main element of the first metal material is the same as that of the second metal material; both weight percentage content of the main element in the first metal material and weight percentage content of the main element in the second metal material are greater than or equal to a threshold; and the threshold ranges from 60% to 100%.

The threshold is a critical value of weight percentage content of a main element in a metal material, and is used to measure whether the two types of metal materials are of a same type. For example, assuming that the threshold is set to 60%, if the main element in the first metal material is the same as the main element in the second metal material, the weight percentage content of the main element in the first metal material is greater than 60%, and the weight percentage content of the main element in the second metal material is also greater than 60%, the first metal material and the second metal material are of a same type.

There may be various types of first metal materials and second metal materials mentioned in the embodiments of this application. For example, both the first metal material and the second metal material are stainless steel. For another example, both the first metal material and the second metal material are titanium alloys. For still another example, both the first metal material and the second metal material are aluminum alloys. For still another example, both the first metal material and the second metal material are magnesium alloys. For still another example, both the first metal material and the second metal material are zinc alloys. For still another example, both the first metal material and the second metal material are copper alloys. Certainly, the first metal material and the second metal material mentioned in the embodiments of this application are not limited to the metal materials mentioned above.

In addition, the middle plate 1 and the outer frame 4 may be made of various types of materials. The materials of the middle plate 1 and the outer frame 4 are not limited in the embodiments of this application.

In the embodiments shown in FIG. 1 to FIG. 3, when the at least one middle element 2 and the at least one welding platform 3 are made of a same type of material, an optimal welding effect can be achieved.

In the embodiments shown in FIG. 1 to FIG. 3, because the middle plate 1 is in contact with components that generate a large amount of heat, such as a battery, a chip, and a circuit board, the middle plate 1 conducts heat outwards. If there is no gap between the middle plate 1 and the outer frame 4, and the middle plate 1 and the outer frame 4 are fully attached to each other, the middle plate 1 conducts all heat to the outer frame 4, so that the outer frame 4 has relatively high temperature, making a user feel hot when the user touches the outer frame 4 with a hand.

To make the middle frame 10 have a better heat insulation effect, in the embodiments of this application, the following manner may be used to ensure that a gap is formed between the outer frame 4 and the middle plate 1.

A first end of the at least one middle element 2 is fixedly connected to the edge of the middle plate 1, and a second end of the at least one middle element 2 extends in a direction away from the middle plate 1; a first end of the at least one welding platform 3 is fixedly connected to the inner side of the outer frame 4, and a second end of the at least one welding platform 3 extends towards the inner side of the outer frame 4; and the second end of the at least one welding platform 3 on the outer frame 4 is in welded connection with the second end of the at least one middle element 2 on the middle plate 1, and a gap is formed between the outer frame 4 and the middle plate 1.

In the embodiments shown in FIG. 1 to FIG. 3, although the middle plate 1 conducts heat to the outer frame 4 through the second end of the at least one welding platform 3 and the second end of the at least one middle element 2, the outer frame 4 and the middle plate 1 are partially connected, and there is still a gap between the outer frame 4 and the middle plate 1. Therefore, a speed at which the middle plate 1 conducts heat to the outer frame 4 through the partial connection is relatively slow, and the gap between the outer frame 4 and the middle plate 1 can achieve a heat insulation effect.

In the embodiment shown in FIG. 3, to make the middle frame 10 have relatively good buffer performance when the middle frame 10 falls, the following manner may be used in this embodiment of this application: The gap formed between the outer frame 4 and the middle plate 1 is filled with plastic 5.

In the embodiments shown in FIG. 1 to FIG. 3, to make the at least one middle element 2 better fastened at the edge of the middle plate 1, the following manner may be used in the embodiments of this application.

The at least one middle element 2 is in embedded connection with the edge of the middle plate 1.

In the embodiments shown in FIG. 1 to FIG. 3, in a die casting process of the middle plate 1, the at least one middle element 2 is embedded into the middle plate 1 when the middle plate 1 is in a molten state, so that the at least one middle element 2 can be better fastened to the middle plate 1.

To ensure that a connection relationship between the at least one middle element 2 and the middle plate 1 is more stable, several holes may be disposed in the at least one middle element 2. In the die casting process of the middle plate 1, liquid metal in a molten state may flow into the several holes in the at least one middle element 2. After the die casting of the middle plate 1 is completed, the connection relationship between the middle plate 1 and the at least one middle element 2 becomes more stable.

In addition, the at least one middle element 2 may be in various types of shapes. For example, the at least one middle element 2 may be of a cuboid structure. Certainly, a specific shape of the at least one middle element 2 is not limited in the embodiments of this application.

Figure 4:
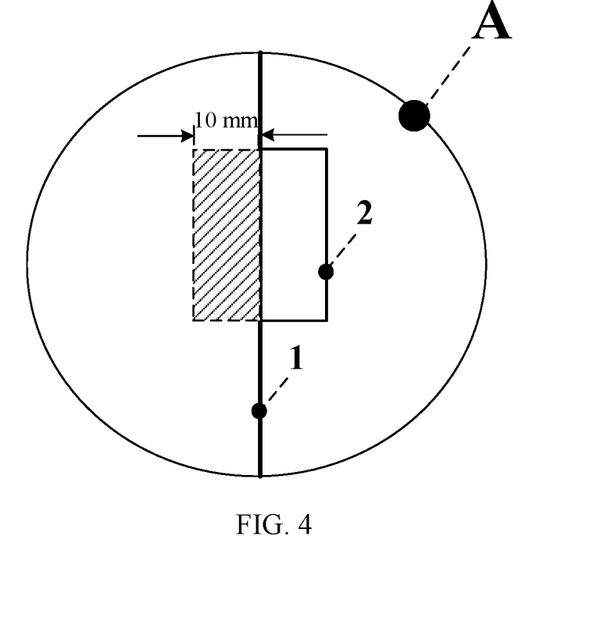
FIG. 4 is an enlarged schematic diagram of a position A in FIG. 1.
Figure 5:
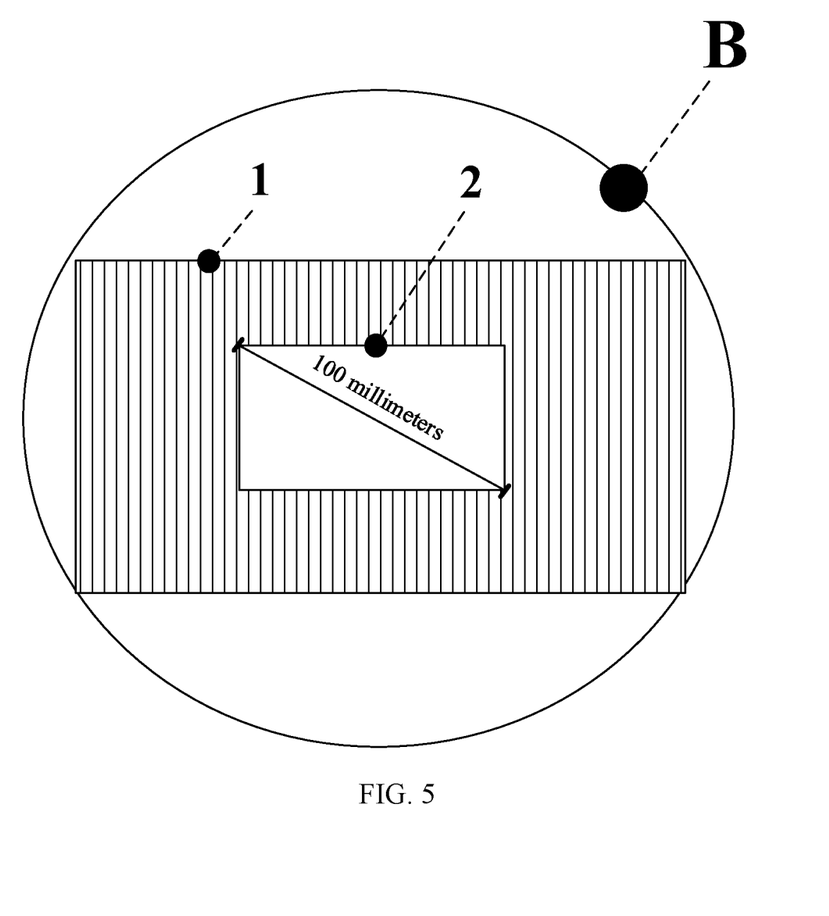
FIG. 5 is an enlarged sectional view of the position A in FIG. 1.

Referring to FIG. 4 and FIG. 5, FIG. 4 is an enlarged schematic diagram of a position A in FIG. 1, and FIG. 5 is an enlarged sectional view of the position A in FIG. 1.

In an embodiment shown in FIG. 4, a depth at which at least one middle element 2 is embedded into a middle plate 1 may be less than or equal to 10 millimeters. For example, in FIG. 4, a part that is of the middle element 2 and that is embedded into the middle plate 1 is a shaded part of the middle element 2, and a depth at which the middle element 2 is embedded into the middle plate 1 is 10 millimeters.

In an embodiment shown in FIG. 5, a longest distance on a cross-section, roughly parallel with a middle plate 1, of a part that is of at least one middle element 2 and that is embedded into the middle plate 1 may be 100 millimeters. For example, in FIG. 5, a longest distance on a cross-section, roughly parallel with the middle plate 1, of a part that is of the middle element 2 and that is embedded into the middle plate 1 may be 100 millimeters.

Figure 6:
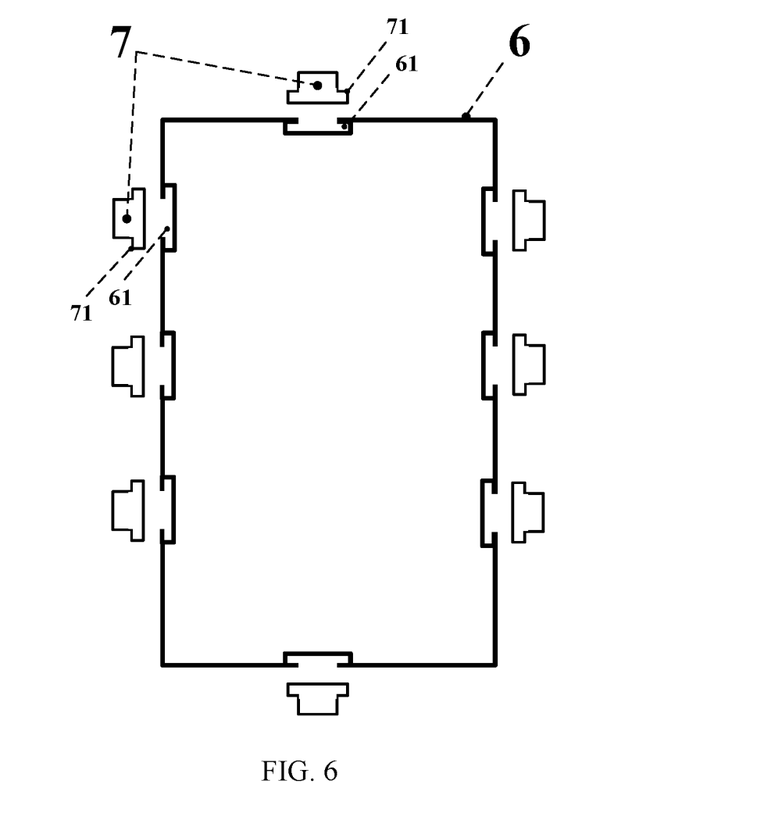
FIG. 6 is a schematic diagram of a middle plate and at least one middle element of another middle frame disclosed in an embodiment of this application.

FIG. 6 is a schematic diagram of a middle plate and at least one middle element of another middle frame disclosed in an embodiment of this application. In the embodiment shown in FIG. 6, to make the at least one middle element 7 better fastened at an edge of the middle plate 6, the following manner may be used in this embodiment of this application.

In the embodiment shown in FIG. 6, at least one groove 61 is disposed on a surface of the middle plate 6, a buckle 71 is disposed on the at least one middle element 7, and the buckle 71 on the at least one middle element 7 is embedded into the at least one groove 61 on the middle plate 6.

In the embodiment shown in FIG. 6, after the buckle 71 on the at least one middle element 7 is embedded into the at least one groove 61 on the middle plate 6, the buckle 71 on the at least one middle element 7 is firmly hooked into the at least one groove 61 on the middle plate 6, achieving better connection performance between the at least one middle element 7 and the middle plate 6.

Figure 7:
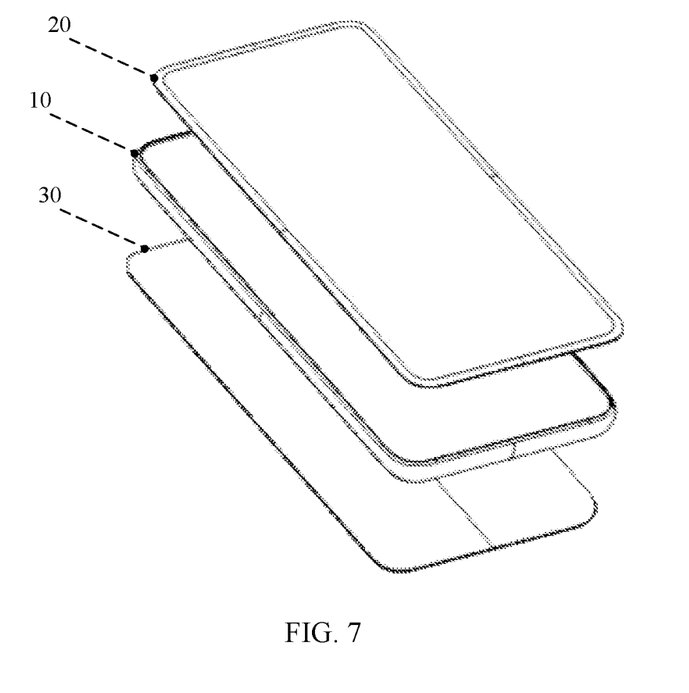
FIG. 7 is a schematic diagram of a terminal device disclosed in an embodiment of this application.

FIG. 7 is a schematic diagram of a terminal device disclosed in an embodiment of this application. The terminal device shown in FIG. 7 includes a display 20, a rear cover 30, and the middle frame 10 shown in FIG. 3. The display 20 and the rear cover 30 are fastened on two sides of the middle frame 10.

In the foregoing specification, the invention has been described in reference to specific exemplary embodiments thereof. It will, however, be evident that various modifications and changes may be made thereto without departing from the described spirit and scope of the invention. The specification and drawings are, accordingly, to be regarded as illustrative rather than a restrictive sense.

What is claimed is:

1. A middle frame, comprising:
a middle plate;
at least one middle element;
at least one welding platform; and
an outer frame, wherein
the at least one middle element is fixedly connected to an edge of the middle plate,
the at least one welding platform is fixedly connected to an inner side of the outer frame, and
the at least one welding platform on the outer frame is in welded connection with the at least one middle element on the middle plate;
wherein the at least one middle element is in embedded connection with the edge of the middle plate, and at least one of (i) a longest distance on a cross-section, roughly parallel with the middle plate, of a part that is of the at least one middle element and that is embedded into the middle plate is 100 millimeters or (ii) a depth at which the at least one middle element is embedded into the middle plate is less than or equal to 10 millimeters.

2. The middle frame according to claim 1, wherein:
a first end of the at least one middle element is fixedly connected to the edge of the middle plate, and a second end of the at least one middle element extends in a direction away from the middle plate;
a first end of the at least one welding platform is fixedly connected to the inner side of the outer frame, and a second end of the at least one welding platform extends towards the inner side of the outer frame; and
the second end of the at least one welding platform on the outer frame is in welded connection with the second end of the at least one middle element on the middle plate, and a gap is formed between the outer frame and the middle plate.

3. The middle frame according to claim 2, wherein the gap formed between the outer frame and the middle plate is filled with plastic.

4. The middle frame according to claim 1, wherein at least one groove is disposed on a surface of the middle plate, a buckle is disposed on the at least one middle element, and the buckle on the at least one middle element is embedded into the at least one groove on the middle plate.

5. The middle frame according to claim 1, wherein a fixed connection of the at least one middle element to the edge of the middle plate and/or the at least one welding platform to the inner side of the outer frame comprises at least one of an embedded connection, bonding, riveting, a screw-locking connection, or a groove-buckle connection.

6. The middle frame according to claim 1, wherein:
the at least one middle element is made of a first metal material;
the at least one welding platform is made of a second metal material;
a main element of the first metal material is the same as that of the second metal material;

both weight percentage content of the main element in the first metal material and weight percentage content of the main element in the second metal material are greater than or equal to a threshold; and the threshold ranges from 60% to 100%.

7. The middle frame according to claim 6, wherein both the first metal material and the second metal material are stainless steel, titanium alloys, aluminum alloys, magnesium alloys, zinc alloys, or copper alloys.

8. A terminal device, comprising:

a display; a rear cover;

a middle frame, wherein the display and the rear cover are fastened to two sides of the middle frame, and wherein the middle frame comprises: a middle plate, at least one middle element, at least one welding platform, and an outer frame, wherein the at least one middle element is fixedly connected to an edge of the middle plate, the at least one welding platform is fixedly connected to an inner side of the outer frame, and the at least one welding platform on the outer frame is in welded connection with the at least one middle element on the middle plate;

wherein the at least one middle element is in embedded connection with the edge of the middle plate, and at least one of (i) a longest distance on a cross-section, roughly parallel with the middle plate, of a part that is of the at least one middle element and that is embedded into the middle plate is 100 millimeters or (ii) a depth at which the at least one middle element is embedded into the middle plate is less than or equal to 10 millimeters.

9. The terminal device according to claim 8, wherein:

a first end of the at least one middle element is fixedly connected to the edge of the middle plate, and a second end of the at least one middle element extends in a direction away from the middle plate;

a first end of the at least one welding platform is fixedly connected to the inner side of the outer frame, and a second end of the at least one welding platform extends towards the inner side of the outer frame; and the second end of the at least one welding platform on the outer frame is in welded connection with the second end of the at least one middle element on the middle plate, and a gap is formed between the outer frame and the middle plate.

10. The terminal device according to claim 9, wherein the gap formed between the outer frame and the middle plate is filled with plastic.

11. The terminal device according to claim 8, wherein at least one groove is disposed on a surface of the middle plate, a buckle is disposed on the at least one middle element, and the buckle on the at least one middle element is embedded into the at least one groove on the middle plate.

12. The terminal device according to claim 8, wherein a fixed connection of the at least one middle element to the edge of the middle plate and/or the at least one welding platform to the inner side of the outer frame comprises at least one of an embedded connection, bonding, riveting, a screw-locking connection, or a groove-buckle connection.

13. The terminal device according to claim 8, wherein:

the at least one middle element is made of a first metal material;

the at least one welding platform is made of a second metal material;

a main element of the first metal material is the same as that of the second metal material;

both weight percentage content of the main element in the first metal material and weight percentage content of the main element in the second metal material are greater than or equal to a threshold; and the threshold ranges from 60% to 100%.

14. The terminal device according to claim 13, wherein both the first metal material and the second metal material are stainless steel, titanium alloys, aluminum alloys, magnesium alloys, zinc alloys, or copper alloys.

* * * * *